Nov. 16, 1937. E. A. LARSSON 2,099,490
COUPLING MECHANISM
Filed April 8, 1936 2 Sheets-Sheet 1

Inventor
Ernst A. Larsson
By
Attorney

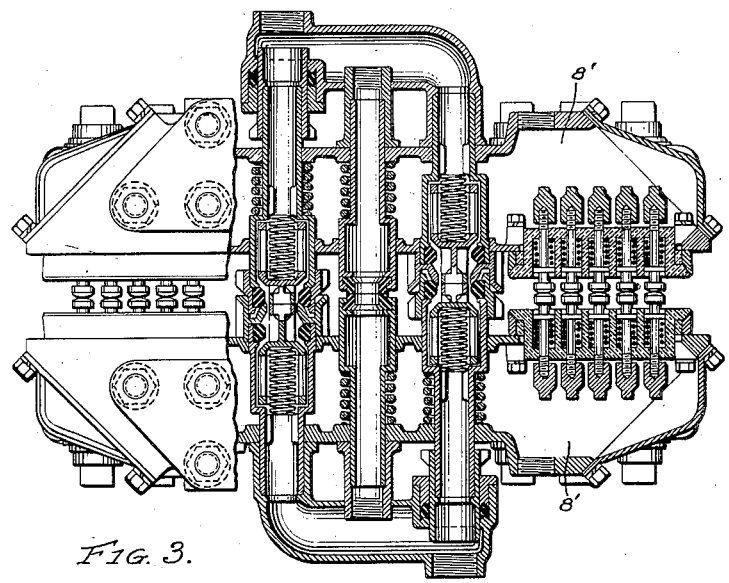
Fig. 3.
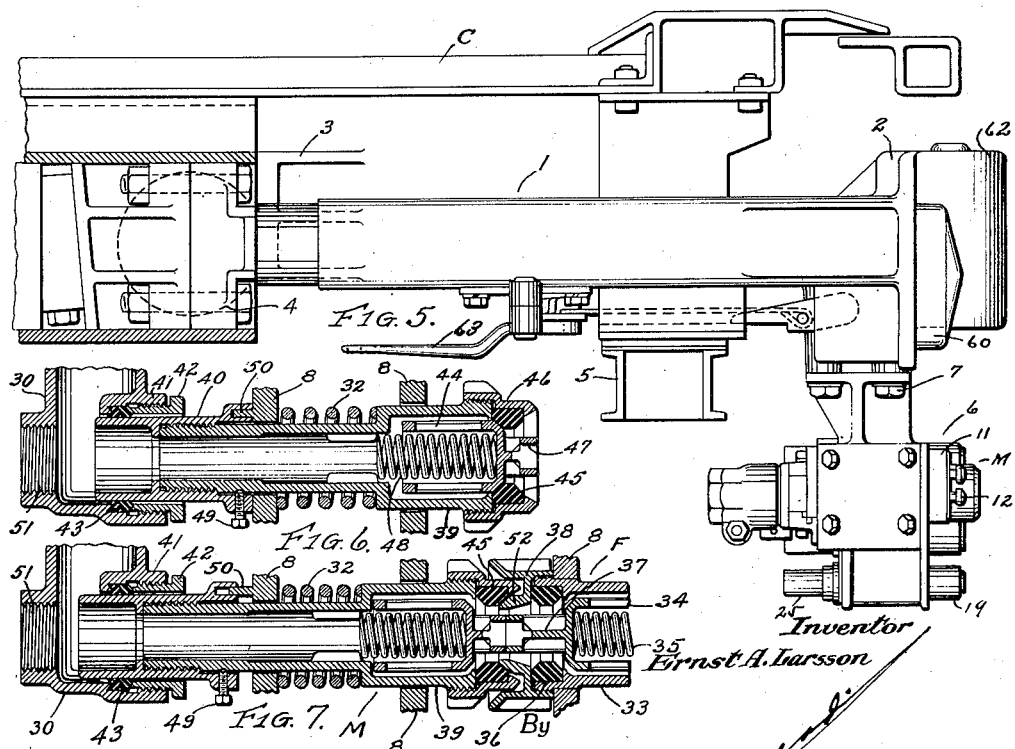

Patented Nov. 16, 1937

2,099,490

UNITED STATES PATENT OFFICE 2,099,490

COUPLING MECHANISM

Ernst A. Larsson, Mansfield, Ohio, assignor to The Ohio Brass Company, Mansfield, Ohio, a corporation of New Jersey Application April 8, 1936, Serial No. 73,331

7 Claims. (Cl. 284—6)

My invention relates to the coupling art and has particular reference to coupling means as applied to present-day cars.

One object of my invention is to provide means for coupling the fluid pressure and electric lines from car to car.

Another object of my invention is to provide means for holding the fluid pressure and electric couplings in tightly coupled relation and simultaneously hold the cars in coupled relation.

By reference to fluid pressure lines and couplings therefor, I have in mind air and steam, and the steam may be at ordinary pressure and temperature, or it may be at very high pressure including what is termed super-heated steam which offers great difficulty to prevent leakage at the couplings.

The type of coupler required to properly maintain the fluid pressure and electric coupler in coupled relation is one which will have practically no lost motion between the heads and couplers of this type are now in commercial use and known as tight lock or no-slack couplers and may be of the Janney type or what is known as the Miller hook type.

My invention consists in suitable means for connecting the electric circuits between cars and also connecting the fluid pressure lines comprising steam and air lines and suitable means for holding such connecting means in coupled relation as hereinafter set forth and particularly pointed out in the claims.

In the drawings:—

Fig. 3 is a partial view on the line 2—2 of Fig. 1 showing two fluid pressure and electric coupling devices in coupled relation.

Fig. 5 is a side view of a supported car coupler and suspended therefrom the fluid pressure and electric coupling device.

Fig. 6 is an enlarged horizontal sectional view of one portion of the steam coupling means shown in section in Fig. 2.

Fig. 7 is an enlarged sectional view of the steam coupling means shown in section in Fig. 3.

Figure 1:
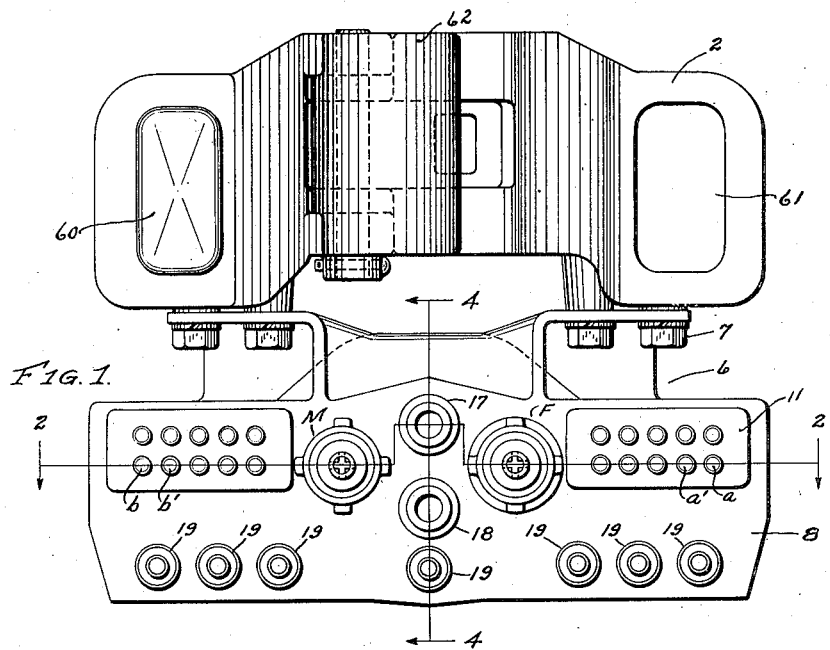
Fig. 1 is a face view of my invention.
Figure 2:
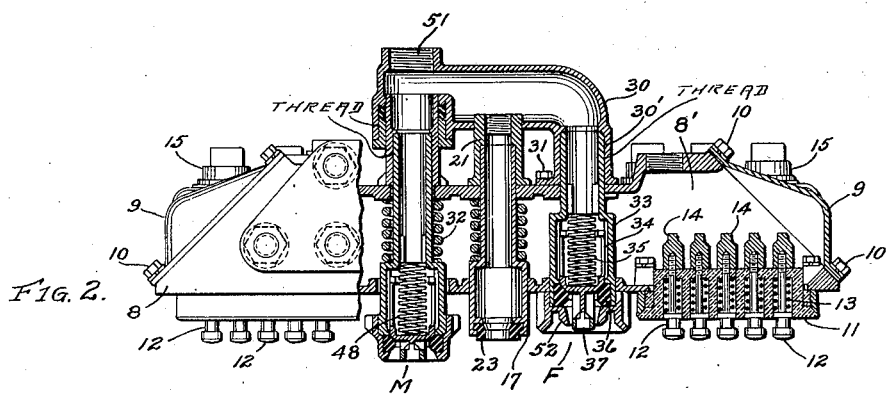
Fig. 2 is a partial view on the line 2—2 of Fig. 1.

In the preferred embodiment of my invention I provide a mechanical coupling means 1 which may function to hold the cars in coupled relation as well as to hold the fluid and electric connecting means in coupled relation. This coupler is of the tight lock type, that is, when two heads are in proper coupled relation there is no longitudinal, vertical or horizontal relative movement of the heads. This will insure the fluid pressure and electric coupling devices being held in coupled relation and if the coupling heads 2 are of the Janney or Miller hook type, the couplings will be automatically made when the cars are brought together.

The coupler 1 is preferably secured to an anchorage 3 by means of the ball and socket attachment 4 thus permitting the coupler to have practically universal movement, excepting in a longitudinal direction, relative to the car body unless draft springs are provided.

The coupler is further supported by means of the support 5 which is usually spring-mounted for vertical movement. Both the anchorage 3 and the support 5 are arranged to be suspended from the car body C.

To the mechanical or car coupler 1, and preferably below and to the head 2 of the car coupler, is detachably secured the fluid pressure and electric coupling device 6 and held in position by the bolts 7.

The fluid pressure and electric coupler comprises a receptacle or enclosing portion 8 provided with detachable side covers 9 held in place by bolts 10. The receptacle 8 is provided with front openings symmetrically positioned on opposite sides of the vertical center line 4—4 of Fig. 1 and in each opening is secured an insulating block 11 in which is mounted electric contactors 12 and yieldingly held in their advanced position by means of the springs 13. To the rear end of the yielding contactors 12 are terminals 14 to which may be attached cables extending into the receptacle 8 through inlets 15.

The similarly positioned yielding contactors on the opposite sides of the vertical center line 4—4 are as a rule electrically connected together in order that when two cars are coupled, regardless of which ends are coupled, like circuits on adjacent cars will be connected, that is, contact $a$ will be cross-connected with contact $b$, and $a'$ will be cross-connected with $b'$, etc., and these cross-connecting wires may be carried through the opening 16 connecting the side portions of the recess 8'.

On the center line 4—4 of Fig. 1 are shown connectors 17 and 18 for air, and 19 for an electric circuit known as a bus line. The connectors 17 and 18 each comprise the tubular member 20 yieldingly held in advanced position by the spring 21. The member 20 is mounted in openings extending through the casing or receptacle 8. To the rear end of the tubular member 20 is screwed a flange fitting 21 which seats against the rear wall of the casing 8 and checks the advance movement of the member 20, and the member 21 is also threaded at 22 for a pipe or hose connection to the air line. The front end of the tubular member 20 is provided with a soft rubber gasket 23 which engages with a like gasket on a cooperating device.

The bus line connector 19 comprises an insulating sleeve 24 reciprocally mounted through the walls of the casing 8 and also secured to the sleeve 24 is a tubular sleeve of insulating material 25. Mounted in the sleeve 24 is a metal contactor 26. The contactor 26 is provided with a bore 27 in which the end of a cable passing through the opening 28 may be secured. The contactor is yieldingly held in its advanced position by means of the spring 29. Three other bus line connectors 19 are shown in Fig. 1 positioned, however, on opposite sides of the vertical center line 4—4.

In order to connect the steam lines which, as stated previously, is not altogether a simple matter especially in the case where the train lines carry super-heated steam which may be at 350 lbs. pressure and possibly 500° F. temperature, I provide special means.

Figure 4:
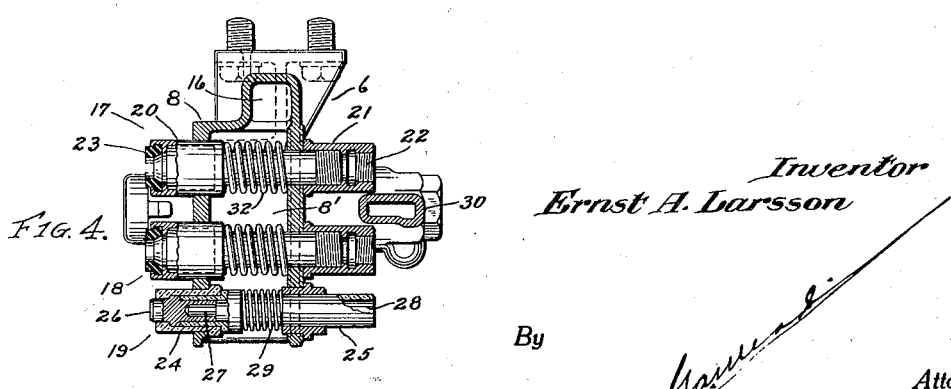
Fig. 4 is a section on the line 4—4 of Fig. 1 through two air and one electric coupling means as later described.

To the rear wall of the casing 8 I secure a manifold 30 as by means of bolts 31. This manifold 30 crosses between the rear of the connectors 17 and 18 (see Fig. 4). Mounted in the casing 8 and associated with the manifold 30 is a fixed connector F and a movable connector M. When two cars are coupled, the connector F on one car engages with the connector M on the other car and forces the connector M rearwardly against the spring 32 which is designed to exert considerable effort to hold the connector M in its advanced position. The connector F is immovable.

The fixed connector F comprises a tubular sleeve 33 which is preferably screw-threaded into the manifold 30 at 30'. Reciprocally mounted within the casing 33 is a check valve 34 which is yieldingly held in its advanced position by a spring 35 and which seats against a composition gasket 36.

The check valve 34 is provided with a projecting contact portion 37 which engages with a similar projection on the check valve in the connector M thus opening the checks on both connectors F and M as shown in Fig. 7. The gasket 36 is held in position by means of the screw cap 38.

The gasket 36 must be of a special material in order to withstand the extremely high pressure and temperature to which it may be subjected. A soft rubber gasket such as 23 used on the air connectors 17 and 18 will not do for the steam connectors. The gaskets 36 are found to be most serviceable when made of a very hard and practically unyielding composition and require rather frequent changing, and the construction of the screw cap permits easy and quick renewal of the gasket 36.

I have found that in a device of the character which I have described, including the coupler 1, and the severe service to which it is subjected in connection with cars coupled in long trains, that one is not justified in relying upon the coupler heads 2 holding the parts in absolutely fixed relation and that due to wear of the parts in making couplings from time to time and the strain on the parts from the heavy loads to which they are subjected, that there is some relative movement of the casings or receptacles 8; therefore, there will be some movement of the fixed connector F relative to the movable connector M when in coupled relation. I find it is necessary to compensate for this relative movement and do so in the construction of the movable connector M.

The movable connector M comprises a reciprocating tubular member 39 mounted in registering openings extending through the front and rear walls of the casing 8. It will be noted by referring to Figs. 6 and 7 that the tubular member 39 does not make a close sliding fit in the casing 8 but that there is considerable space between the casing 8 and the member 39 which permits of lateral movement of the member 39 relative to the casing 8. This is a very important feature I find to the successful operation of the connectors and the increased life of the gaskets.

The tubular member 39 is screw-threaded into a sleeve 40 which butts against the outer face of the rear wall of the casing 8, thus limiting the advance movement of the connector due to the spring 32.

Since the member 40 is loose and slidably mounted in the manifold 30, it is necessary to provide a tight joint therebetween, therefore, I form a stuffing box 41 and a stuffing gland 42 and provide in the stuffing box packing 43. This packing is of a more or less yieldable material and, therefore, does not interfere with the relative movement of the connector M laterally for adjustment purposes. While I have shown clearance between the parts 40 and 42, I find that this is not necessary in order to make adjustment at the front end of the connector as the length of bearing surface between the parts 40 and 42 is relatively limited and does not restrict the said lateral movement.

Mounted within the member 39 is a check valve 44 which seats against the gasket 45. The gasket 45 is held in position by the screw retainer 46. Projecting forwardly from the check valve 44 is a member 47 arranged to engage with the projection 37 on the connector F when two heads are coupled, thus compressing the spring 48 and opening the normally closed passage through the connector M and also the connector F.

In order to make it possible to easily and quickly renew the gasket 45 and with the use of the least number of tools, I lock the member 39 against rotation by securing the parts 39 and 40 against relative rotation by means of the set screw 49 and these two members are prevented from rotation relative to the casing 8 by means of a dowel pin 50 projecting from the casing 8 into an opening in the member 40 thereby preventing rotation of the member 39, but not preventing the longitudinal and lateral movements of the member 39. The member 30 has a threaded opening 51 for connecting thereto the steam line.

The member 38 on the fixed connector F is provided with a circular flange or lip 52 arranged to firmly engage the gasket 45 on the connector M and the degree of this engagement depends upon the force exerted by the springs 32 and 35, and is quite heavy due to the severe requirements in maintaining the parts against leakage under the high pressure and temperature to which they are subjected. The engaging portion of the flange 52 is preferably circular and formed with a definite radius permitting a ball and socket action between the parts 52 and 45 due to relative movement.

With the type of coupler 2 shown in Figs. 1 and 7, I provide a projection 60 and an opening or recess 61 and a locking knuckle 62 whereby on two coupled heads the projection 60 on each head will interfit with the opening 61 on the coupled head to prevent relative vertical and lateral movement of the heads and the knuckles 62 on the coupled heads will interlock to hold the heads against relative longitudinal movement. As previously stated, the tendency of the coupled heads will be to hold the electric and fluid pressure couplers in tightly coupled relation but on account of wear of the parts from continued use, and the severe strain to which the devices are subjected, there may be a tendency for some slight movement of the electric and fluid pressure couplers when in coupled relation, and for this reason it is very important I find to have the clearance previously described and shown in Figs. 6 and 7 between the part 39 and the walls of the receptacle 8.

The coupler 2 is also provided with an uncoupling mechanism 63.

The operation of my invention will be clearly understood from the drawings and the above description, and needs no further explanation.

Having thus described my invention, what I claim and desire to secure by Letters Patent is:—

1. A coupling mechanism to cooperate with a similar device comprising, a receptacle having a front wall and a back wall, tubular fluid pressure connecting means positioned on opposite sides of the vertical center line of the front wall and projecting from the front wall of the receptacle, one connector reciprocally and yieldingly held in its advanced position and the other connector held in fixed relation to the receptacle, each connector provided with a normally closed check valve, the fixed connector arranged to couple with the movable connector of a counterpart coupler and effect an opening of the check valves on both connectors, a manifold attached to the rear wall of the receptacle and provided with three openings, means to connect one opening to a fluid train line and the other two openings arranged to receive the rear end of the fixed and reciprocating connectors, the free end of the reciprocating connector arranged to move transversely relative to the receptacle to permit the movable connector and the fixed connector coupled thereto to maintain alignment should the receptacles on two coupled heads shift relative to each other and means to support the receptacle from a car and to cooperate with similar means on a coupled car to hold the fluid coupling mechanisms on two cars in coupled relation.

2. A coupling mechanism to cooperate with a counterpart coupling mechanism to connect fluid pressure train line on two coupled cars comprising, a hollow support member having a back wall and a front wall, tubular fluid connecting means positioned on opposite sides of the vertical center line and equally spaced from the center line and projecting from the face of the front wall to conduct a fluid from the rear of the support member to the front thereof, one connecting means being fixed relative to the support member and the other means arranged to reciprocate and having means yieldingly holding it in its advanced position, each connecting means extending through the support means and having a spring-held check valve provided with projecting means to be engaged by like means on the cooperating head to open both valves, a manifold spanning said vertical center line and having one end secured to the outside face of the back wall and the other end spaced from the wall, each end of the manifold having an opening into which project the rear ends of the tubular fluid connecting means, one connecting means mounted in fixed relation to the manifold and the other fluid connecting means being reciprocally mounted relative to the manifold and its front end laterally movable relative to the support member and coupling means to support the support member from a car and cooperate with like means on a coupled car to hold the fluid pressure connecting means on both cars in coupled relation and couple the cars and means for attachment of a fluid pressure line to the manifold.

3. A fluid pressure connecting device for fluid pressure lines on coupled cars comprising, a support, tubular reciprocating means mounted on the support and a spring yieldingly holding the means in its advanced position, the reciprocating means having a lateral movement relative to the support, a manifold for cross-connecting the reciprocating means with other tubular means mounted on the support, means to prevent rotation of the tubular means without preventing its reciprocation and lateral movements, a packed joint between one end of the tubular means and the manifold, a renewable gasket at the front end of the tubular means and a check valve in the said means normally held closed by a spring, the gasket arranged to be engaged by the check valve when closed and by the fluid pressure connecting means on a cooperating fluid pressure connecting device to connect the fluid pressure lines on coupled cars and to open the check valves in both connecting means and means for connecting a fluid pressure line to the manifold.

4. A fluid pressure coupling mechanism comprising, an elongated tubular member having a bight at one end with an end opening and the member having a side opening at the other end and opening in the same direction as the above opening and the end of the member adjacent the last opening closed, a third opening in the member for attaching a fluid pressure line thereto, the first said opening being internally threaded, a tubular connecting means fixedly secured in the threaded opening, the second said opening provided with means forming a stuffing box, a tubular connecting means mounted in said second opening in reciprocating relation to the tubular member and movable relative to the first said tubular connecting means, the tubular connecting means so constructed and arranged relative to each other to engage in butt end contact with like means on a cooperating coupling mechanism, the first said opening having means adjacent thereto to engage with a support and arranged to be attached thereto.

5. A receptacle for a coupling mechanism to cooperate with a counterpart mechanism for connecting the fluid pressure lines on coupled cars comprising, a hollow member having a front wall with openings therein to the interior of the member, a rear wall having openings in alignment with some of the aforesaid openings, the openings arranged to receive coupling devices, covers detachably secured to the member to close the ends, a bottom wall and a top wall for the said member, a duct formed as part of the member and positioned above and spanning a portion of said registering openings in the front and rear walls, and means on the member for attaching it to a support.

6. A connecting device for a fluid pressure connector comprising, a tubular member threaded at the rear end, a support for the tubular member, a sleeve screw threaded onto the threaded end and arranged to engage a stop on the support, the tubular member having an enlarged front end, a check valve mounted in the enlarged end, a gasket mounted in the enlarged end, means to hold the gasket in position to be engaged by the valve and by a connector on a cooperating device and permit renewal of the gasket, and means mounted within the valve to yieldingly hold the check valve in its closed position in engagement with the gasket, the enlarged end of the tubular member movable laterally relative to the support.

7. A coupling mechanism to cooperate with a similar device comprising, a receptacle having a front wall and a back wall, tubular fluid connectors positioned on opposite sides of the vertical center line of the front wall and one connector projecting from the front wall of the receptacle and reciprocally and yieldingly held in its advance position and the other connector held in fixed relation to the receptacle, a normally closed check valve associated with each connector, the fixed connector arranged to cooperate with the movable connector on a counterpart coupler and effect an opening of the check valves on both connectors, means associated with the rear wall for cross-connecting the said connectors, the cross-connecting means provided with an opening permitting the flow of a fluid either into or out of the cross-connecting means, the reciprocating connector being so constructed and arranged relative to the receptacle that the front end of the connector is movable transversely relative to the front wall of the receptacle to maintain the front ends of the fixed and movable connectors on counterpart couplers in sealed engagement should the receptacles shift transversely relative to each other and means to support the receptacle from a car and to cooperate with a similar means on a coupled car to hold the fluid coupling mechanisms on the two coupled cars in coupled relation.

ERNST A. LARSSON.